United States Patent Office 3,166,587
Patented Jan. 19, 1965

3,166,587
ALKANOYL, HYDROXY-UREAS
Jack Bernstein and Kathryn Alice Losee, New Brunswick,
N.J., assignors to Olin Mathieson Chemical Corporation, New York, N.Y., a corporation of Virginia
No Drawing. Filed July 29, 1963, Ser. No. 298,456
11 Claims. (Cl. 260—553)

This invention relates to carbamoylhydroxylamines. More particularly the invention relates to carbamoylhydroxylamines having the formula

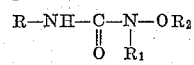

R in the formula represents hydrogen or lower alkyl, e.g., methyl, ethyl, propyl, isopropyl, butyl, isobutyl or the like. $R_1$ is lower alkyl or alkanoyl, i.e., the acid radical of a fatty acid, preferably a lower fatty acid such as formic acid, acetic acid, propionic acid, butyric acid, isobutyric acid and the like. $R_2$ represents hydrogen, lower alkyl or lower alkanoyl. At least one of $R_1$ and $R_2$ is acyl. Preferably, if $R_1$ is formyl, then $R_2$ is either hydrogen or lower alkyl.

The new compounds of the formula are produced by treating hydroxyurea or an alkyl hydroxyurea with an appropriate acylating agent such as an acyl halide or acid anhydride wherein the acyl moiety corresponds to the definition above. The reaction may be effected at a temperature from about room temperature to about 100° C. When $R_1$ is formyl, the acylating agent may either be formic acid or a mixed anhydride formed by the reaction of formic acid and acetic anhydride.

The new compounds of this invention are useful as antibacterial and antifungal agents, e.g., to combat organisms such as *Staphylococcus aureus, Salmonella schottmuelleri, Pseudomonas aeruginosa, Proteus vulgaris* and *Trichophyton mentagrophytes.*

The following examples illustrate the invention. All temperatures are expressed in degrees centigrade.

EXAMPLE 1

*N-carbamoyl-N-formylhydroxylamine*

A solution of 7.6 grams of hydroxyurea in 25 ml. of 98–100% formic acid is warmed for one hour at 40°. The reaction mixture is then cooled and the product which crystallizes is recovered by filtration. It is purified by crystallization from acetonitrile and melts sharply at 129° with decomposition.

EXAMPLE 2

*N-carbamoyl-N-formylmethoxyamine*

A solution of 3.7 grams of methoxyurea, 25 ml. of 98–100% formic acid and 2 ml. of acetic anhydride is heated for 12 hours at 80–90°. The reaction mixture is then concentrated under reduced pressure to yield a solid residue. The residue is triturated with ether and the mixture filtered. The product after crystallization from alcohol benzene melts at 136–138° with decomposition.

EXAMPLE 3

*N-methylcarbamoyl-N-formylhydroxylamine*

Following the procedure of Example 1, but substituting 9.0 grams of 3-methyl-1-hydroxyurea for the hydroxyurea, N-methylcarbamoyl-N-formylhydroxylamine is obtained.

EXAMPLE 4

*N-methylcarbamoyl-N-formylmethoxyamine*

Following the procedure of Example 2 but substituting 4.1 grams of 3-methyl-1-methoxyurea for the methoxyurea there is obtained N-methylcarbamoyl-N-formylmethoxyamine.

EXAMPLE 5

*N,O-diacetyl-N-carbamoylhydroxylamine*

A mixture of 7 grams of hydroxyurea in 90 ml. of acetic anhydride containing 3 drops of pyridine is heated to 60°–70° for 4 hours. The excess acetic anhydride is removed under reduced pressure and the residue triturated with ether to give the desired product. After crystallization from benzene the product melts at 96–98°.

What is claimed is:
1. A compound of the formula

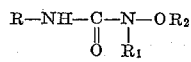

wherein R is a member of the group consisting of hydrogen and lower alkyl, $R_1$ is a member of the group consisting of lower alkyl and lower alkanoyl, and $R_2$ is a member of the group consisting of hydrogen, lower alkyl and lower alkanoyl, at least one of $R_1$ and $R_2$ being lower alkanoyl.

2. A compound of the formula

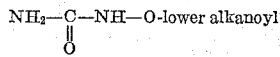

3. A compound of the formula

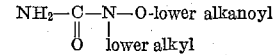

4. A compound of the formula $$NH_2-\underset{\underset{O}{\|}}{C}-\underset{\underset{\text{lower alkanoyl}}{|}}{N}-O\text{-lower alkyl}$$

5. A compound of the formula

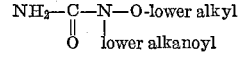

6. A compound of the formula

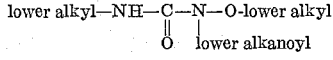

7. N-carbamoyl-N-formylhydroxylamine.
8. N-carbamoyl-N-formylmethoxyamine.
9. N-methylcarbamoyl-N-formylhydroxylamine.
10. N-methylcarbamoyl-N-formylmethoxyamine.
11. N,O-diacetyl-N-carbamoylhydroxylamine.

References Cited by the Examiner
UNITED STATES PATENTS
3,110,728  11/63  Takamatsu et al. _____ 260—553

FOREIGN PATENTS
1,140,925  12/62  Germany.

IRVING MARCUS, *Primary Examiner.*
JOHN D. RANDOLPH, *Examiner.*